(12) United States Patent
Fay et al.

(10) Patent No.: US 6,322,022 B1
(45) Date of Patent: Nov. 27, 2001

(54) BURN THROUGH RESISTANT SYSTEMS FOR TRANSPORTATION, ESPECIALLY AIRCRAFT

(75) Inventors: Ralph Michael Fay, Lakewood; Rebecca Sue Wulliman, Englewood; James Walter Stacy, Peyton; Jeffrey Canon Townsend, Highlands Ranch; Steven N. Volenec, Englewood, all of CO (US)

(73) Assignee: Johns Manville International, Inc., Denver, CO (US)

( * ) Notice: Subject to any disclaimer, the term of this patent is extended or adjusted under 35 U.S.C. 154(b) by 0 days.

(21) Appl. No.: 09/440,010

(22) Filed: Nov. 12, 1999

Related U.S. Application Data

(60) Provisional application No. 60/108,541, filed on Nov. 16, 1998.

(51) Int. Cl.[7] ............................................. B64C 1/40
(52) U.S. Cl. ................................. 244/121; 244/158 A
(58) Field of Search ................................ 244/121, 158 R, 244/158 A, 133, 117 R, 119; 428/920, 902, 285

(56) References Cited

U.S. PATENT DOCUMENTS

| | | |
|---|---|---|
| 3,814,659 | 6/1974 | Nadeau . |
| 4,314,682 * | 2/1982 | Barnett et al. .................. 244/158 R |
| 4,576,857 * | 3/1986 | Gannett et al. ...................... 244/119 |
| 5,030,518 * | 7/1991 | Keller .................................. 428/920 |
| 5,038,693 * | 8/1991 | Kourtides et al. .................. 428/285 |
| 5,277,959 * | 1/1994 | Kourtides et al. .................. 428/920 |
| 5,373,305 * | 12/1994 | Lepore et al. ...................... 343/909 |
| 5,595,817 | 1/1997 | Schaefer . |
| 5,598,989 * | 2/1997 | Ross et al. ........................ 244/158 A |
| 6,013,361 * | 1/2000 | Seal et al. .......................... 428/902 |

FOREIGN PATENT DOCUMENTS

| | | |
|---|---|---|
| 0736373 | 10/1996 | (EP) . |
| 94 25180 | 11/1994 | (WO) . |

\* cited by examiner

*Primary Examiner*—Galen L. Barefoot
(74) *Attorney, Agent, or Firm*—Robert D. Touslee

(57) ABSTRACT

An encapsulated insulation composite system for increasing the burn through resistance of an aircraft fuselage includes: an insulation layer of glass fiber or foam insulation and a coating or interleaf barrier layer of a high temperature resistant material and/or a coating or barrier layer of a high temperature resistant material on an outer major surface of the insulation layer of the composite and a film encapsulating the composite. Preferably, the barrier layer or layers include a reflective mineral, such as a reflective mineral containing coating carried on a sheet material. Preferably, the encapsulating film is a polymeric film such as a polyimide film.

21 Claims, 1 Drawing Sheet

BURN THROUGH RESISTANT SYSTEMS FOR TRANSPORTATION, ESPECIALLY AIRCRAFT

This application claims priority to provisional application Serial No. 60/108,541, filed Nov. 16, 1998, the disclosure of which is fully incorporated herein.

BACKGROUND OF THE INVENTION

The present invention relates to an insulation system for aircraft fuselages and, in particular, to an insulation system for increasing the burn through resistance of aircraft fuselages to provide passengers with additional time within which to evacuate an airplane in the event of an external fuel fire.

Currently, the Federal Aviation Administration (the FAA) is testing various aircraft fuselage sidewall constructions to determine if they can demonstrate a significant increase in burn through resistance in a simulated exterior fire condition. For example, the test simulates a situation where the aircraft is on the ground and a jet fuel fire ignites next to the outside of the fuselage.

The baseline fuselage sidewall construction in current use combines an interior trim panel with one or more layers of Microlite AA fiberglass insulation blanket, encapsulated in a reinforced Mylar film, that is positioned in the framework of an aircraft with an exterior aluminum skin. The fiberglass blanket currently used in the baseline construction is 0.42 pound per cubic foot (pcf)×1 inch (6.7 Kg/m$^3$×25.4 mm) or 0.6 pcf×1 inch (9.6 Kg/m$^3$×25.4 mm) Microlite AA. In some constructions used by aircraft manufacturers, one or all of the Microlite AA fiberglass blanket layers are replaced with a 0.3 pcf×1 inch to a 0.6 pcf×1 inch (4.8 Kg/m$^3$×25.4 mm to 9.6 Kg/m$^3$×25.4 mm) polyimide foam.

In a real or simulated fire condition, all of the individual fuselage components melt away quickly and permit flame to penetrate into the passenger compartment The baseline fuselage construction typically provides only a couple of minutes of burn through protection in these tests. There are many ways to improve burn through protection in an aircraft fuselage. However, the most obvious solutions require a significant addition of weight which is undesirable in aircraft construction.

SUMMARY OF THE INVENTION

By replacing the current two to three layers of 0.42 pcf×1 inch (6.7 Kg/m$^3$×25.4 mm) or 0.6 pcf×1 inch (9.6 Kg/m$^3$×25.4 mm) Microlite AA blanket insulation system, described above, with the burn through resistant system of the present invention, the length of time it takes to burn through the insulation portion of the system has been shown to increase from a couple of minutes to more than five minutes and preferably more than 7 minutes. The burn through resistant system of the present invention has one or more coating or interleaf barrier layers of high temperature resistant material included in the encapsulated multilayered construction of fiberglass blanket layers and/or foam insulation layers.

To provide good results in the simulated fire condition of a full scale FAA simulated burn through test, the system must also be able to withstand moderate air pressure fluctuations attributed to the pulsing flame front or wind. The burn through resistant system of the present invention is able to withstand such moderate air pressure fluctuations.

DESCRIPTION OF THE PREFERRED EMBODIMENTS

Figure 1:
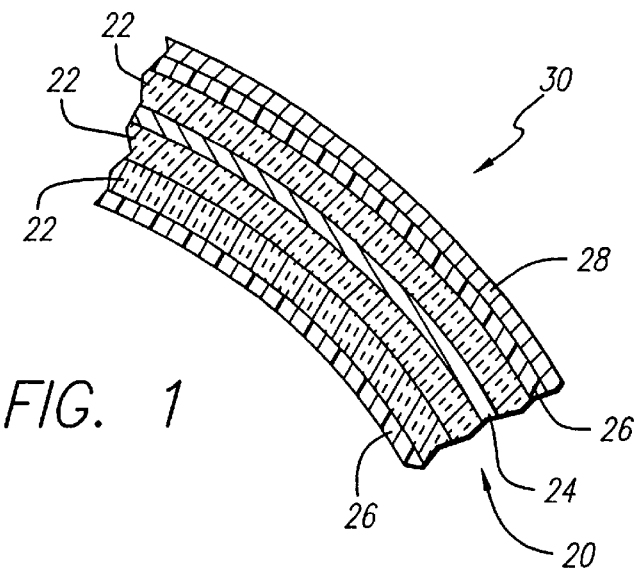
FIG. 1 is a schematic cross section through a first embodiment of the burn through resistant system of the present invention installed in a fuselage with one coating or interleaf layer of high temperature resistant material intermediate insulation layers of the system.
Figure 2:
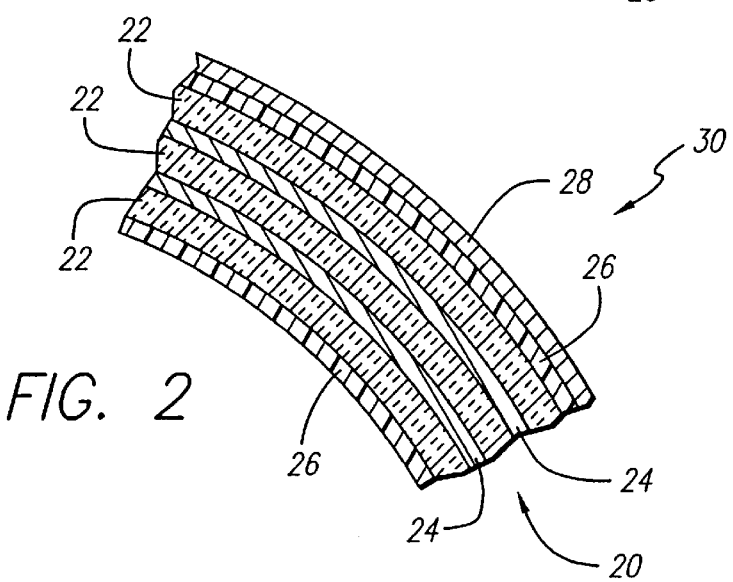
FIG. 2 is a schematic cross section through a second embodiment of the burn through resistant system of the present invention installed in a fuselage with two coating or interleaf layers of high temperature resistant material intermediate insulation layers of the system.

As shown in FIG. 1, a first embodiment of the burn through resistant system 20 includes a plurality of glass fiber insulation blanket layers and/or foam insulation sheet layers 22 and one high temperature resistant material coating or interleaf barrier layer 24 intermediate two of the insulation layers 22. The glass fiber insulation blanket layers and/or foam insulations sheet layers 22, along with the high temperature resistant material coating or interleaf barrier layer 24, are encapsulated or endosed within an envelope 26 and placed against or adjacent the skin 28, e.g. aluminum skin, of the aircraft fuselage 30. As shown in FIG. 2, a second embodiment of the burn through resistant system 20 includes a plurality of glass fiber insulation blanket layers and/or foam insulation sheet layers 22 and two high temperature resistant material coating or interleaf layers 24 which are each located intermediate two of the insulation layers 22. The glass fiber insulation blanket layers and/or foam insulations sheet layers 22, along with the high temperature resistant material coating or interleaf barrier layers 24, are encapsulated or enclosed within an envelope 26 and placed against or adjacent the skin 28, e.g. aluminum skin, of the aircraft fuselage 30. In both of the embodiments shown, the major surfaces of the insulation layers 22 and the coating or interleaf barrier layers 24 extend in planes parallel to or substantially parallel to each other and the major surfaces of the skin 28. The systems of FIGS. 1 and 2 could include additional insulation layers 22 and high temperature resistant material coating or interleaf layers 24.

Figure 3:
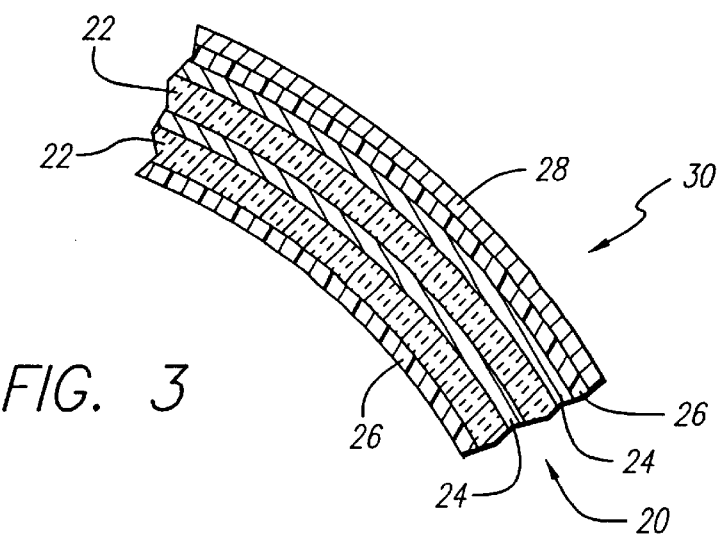
FIG. 3 is a schematic cross section through a third embodiment of the burn through resistant system of the present invention installed in a fuselage with a coating or interleaf layer of high temperature resistant material among an insulation layer and the encapsulating envelope of the system.

In the embodiment of the burn through resistant system 20 shown in FIG. 3, the system 20 includes a plurality of glass fiber insulation blanket layers and/or foam insulation sheet layers 22; a first high temperature resistant material coating or interleaf barrier layer 24 located intermediate one of the insulation layers 22 and the envelope 26 on the outer or fuselage skin facing side (the flame facing side) of the system; and a second high temperature resistant material coating or interleaf barrier layer 24 located intermediate two of the insulation layers 22. An envelope 26 encapsulates or encloses the insulation layers 22 and coating or interleaf layers 24. The system 20 is placed against or adjacent the skin 28, e.g. aluminum skin, of the aircraft fuselage 30 with the portion of the envelope covering the first coating or interleaf barrier layer 24 of high temperature resistant material adjacent the skin 28 of the aircraft. As with the embodiments of FIGS. 1 and 2, the major surfaces of the insulation layers 22 and the coating or interleaf layers 24 extend in planes parallel to or substantially parallel to each other and the major surfaces of the fuselage skin 28. While not shown in FIG. 3, additional coating or interleaf barrier layers 24 of high temperature resistant material can be included intermediate the insulation layers 22.

Preferably, the glass fiber blanket layers 22 are one inch (25.4 mm) thick Microlite AA glass fiber insulation blankets (manufactured and sold by Johns Manville International, Inc.) having densities of about 0.42 pcf (6.7 Kg/m$^3$) or one inch (25.4 mm) thick Premium NR glass fiber insulation blankets (manufactured and sold by Johns Manville International, Inc.) having densities of about 0.34 pcf (5.4 Kg/m$^3$). Preferably, the foam insulation layers 22 are one inch (25.4 mm) thick polyimide foam insulation layers having densities of about 0.3 pcf (4.8 Kg/m$^3$) to about 0.6 pcf (9.6 Kg/m$^3$).

Preferably, the high temperature resistant coating or interleaf barrier layer or layers 24 include a reflective plate-like mineral, such as but not limited to vermiculite, applied in a coating to or incorporated into one or both major surfaces of a sheet, such as a paper sheet, an organic fiber mat, a glass fiber mat, or a fabric sheet. The high temperature resistant coating or interleaf layers 24 can also be applied as a coating directly to one or more of the major surfaces of the insulation layers 22. One example of an interleaf barrier layer 24 includes a paper like product, such as Manninglas 1208 paper (manufactured by Lydall Corporation) made from 6.5 micron DE glass (litle or no binder is used to produce the paper) and vermiculite which is applied as a coating on one or both sides or major surfaces of the paper sheet. An interleaf barrier layer 24 of Manninglas 1208 paper coated on both sides weighs 13.8 g/ft$^2$ (148 g/m$^2$). An insulation system 20 using three layers 24 of 0.34 Premium NR fiber glass blanket to sandwich two layers of Manninglas 1208 paper weighs about 66 g/ft$^2$ (710 g/m$^2$) (the weight of the aluminum fuselage skin is not included). Another example of an interleaf barrier layer 24 includes a spunlaced fabric, such as Freudenberg C1999VM aircraft seat cushion fire block fabric made from 70% Curlon partially oxidized PAN fiber and 30% Kynar phenolic fiber and zig-zag stitched with a high temperature resistant organic fiber, and vermiculite which is applied as a coating to one or both sides or major surfaces of the fabric. A burn through resistant system 20 of the present invention using one interleaf barrier layer of Freudenberg C1999VM fabric coated with a vermiculite coating and sandwiched between two outboard fiber glass or polyimide foam layers 22 is considered tough enough to withstand the air pressure fluctuations attributed to a pulsing flame front or wind and provides greater than 7 minutes of burn through resistance. This embodiment of the system 20, using three layers 22 of 0.42 pcf (6.7 Kg/m$^3$) Microlite AA glass fiber blanket and one interleaf barrier layer 24 of vermiculite coated Freudenberg C1999VM fabric weighs about 62.5 g/ft$^2$ (672 g/m$^2$) (the weight of the aluminum fuselage skin is not induded). Due to the desire to keep aircraft fuselages as light as practical, the systems 20 of the present invention preferably weigh less than 70 g/ft$^2$ (753 g/m$^2$) not including the weight of the fuselage skin.

Preferably, the encapsulating envelope 26 is a polymeric film envelope, such as but not limited to a Mylar film or a polyimide film envelope with a polyimide film envelope being preferred since the use of such an envelope extends the burn through time when compared to a Mylar film envelope. Two burn through resistant systems were tested using the same core materials, but with different film envelopes. A three layer system of 0.42 pcf (6.7 Kg/m$^3$) Microlite AA glass fiber blankets was tested with a Mylar film covering and also with a polyimide film covering (System configuration I). A three layer system of ANSC carbon fiber blanket and two layers of 0.42 pcf (6.7 Kg/m$^3$) Microlite AA glass fiber blankets was also tested with a Mylar film covering and also with a polyimide film covering (System configuration II). With System configuration I, the burn through time using the Mylar film covering was about 2.67 minutes and the burn through time using the polyimide film covering was about 3.25 minutes. With System configuration II, the burn through time using the Mylar film covering was about 4.25 minutes and the burn through time using the polyimide film covering was about 8.50 minutes. Thus, in both tests, the system covered with the polyimide film exhibited a longer burn through time.

The term "burn through time" as used in this specification and claims relates to a test method developed by Johns Manville Intemational, Inc. and is based on an ASTM E-119 test rig. This ASTM test method is a standard one for fire tests of building construction and materials. The test sample is 73.7 cm×73.7 cm square and is tested in a vertical configuration. The sample itself is made up of a "system" consisting of a 1.6 mm thick aluminum skin to the fire side and the insulation batting enclosed in covering films of various types. The sample does not include an interior trim panel as part of the fuselage construction. The system sample is subjected to a furnace with a heat flux of 12 to 15 W/cm$^2$ and a temperature of 1093° C. The test begins when a sliding door separating the furnace from the system test sample is removed. The time of failure back to the back or cold side covering film is recorded, and the "burn through time" is deemed to be when the flame reaches or penetrates to the cold side.

Initial test results from this method showed that aluminum skin on its own achieved an approximate failure time of one minute. The standard configuration of three layers of 0.42 pcf (6.7 Kg/m$^3$) Microlite AA glass fiber blanket encased in Mylar film (System configuration I) yielded a result of 2.67 minutes to burn through. A system consisting of a layer of carbon fiber batting and two layers of fiber glass encapsulated in polyimide film (System configuration II) yielded a burn through time of 8.55 minutes in the above described Johns Manville International, Inc. test apparatus. These results show good relative ranking with the full scale FAA results for burn through time.

The system 20 of the present invention preferably has a burn through time of at least 5 minutes and more preferably, 7 minutes. A system 20 of the present invention including three insulation layers 22 of 0.42 pcf×1 inch (6.7 Kg/m$^3$× 25.4 mm) Microlite AA glass fiber blanket and two interleaf barrier layers 24 of 40 mil Manninglas 1208 glass fiber mat coated on both sides with vermiculite, encapsulated within AN47R Mylar film, exhibited a burn through time of greater than 10:00 minutes (film failure at 5:00 minutes; test stopped after 10:00 minutes). A system 20 of the present invention including two outer insulation layers 22 of 0.42 pcf×1 inch (6.7 Kg/m$^3$× 25.4 mm) Microlite AA glass fiber blanket, an intermediate layer 22 of 0.3 pcf×1 inch (4.8 Kg/m$^3$×25.4 mm) Aero-mide polyimide foam and two interleaf barrier layers 24 of 40 mil Manninglas 1208 glass fiber mat coated on both sides with vermiculite, encapsulated within AN47R Mylar film, exhibited a burn through time of 10:00 minutes (film failure at 4:38 minutes; excessive smoke from foam; test stopped after 10:00 minutes). A system 20 of the present invention including three insulation layers 22 of 0.42 pcf×1 inch (6.7 Kg/m$^3$×25.4 mm) Microlite AA glass fiber blanket and two interleaf barrier layers 24 of 0.015 inch (0.38 mm) Manninglas 1208 glass fiber mat knife coated with vermiculite, encapsulated within Insulfab 240 Mylar film, exhibited a burn through time of greater than 10:00 minutes (film failure at 3:54 minutes; standard smoke; glowing mat at 5:21 minutes; test stopped after 10:00 minutes). A system 20 of the present invention including two outer insulation layers 22 of 0.42 pcf×1 inch (6.7 Kg/m³×25.4 mm) Microlite AA glass fiber blanket, an intermediate layer 22 of 0.3 pcf×1 inch (4.8 Kg/m³×25.4 mm) Aero-mide polyimide foam and two interleaf barrier layers 24 of 0.015 inch (0.38 mm) Manninglas 1208 glass fiber mat knife coated with vermiculite, encapsulated within an Insulfab 240 Mylar film, exhibited a burn through time of greater than 10:00 minutes (film failure at 4:04 minutes; medium smoke; glowing mat at 6:10; test stopped after 10:00 minutes). A system 20 of the present invention including three insulation layers 22 of 0.42 pcf×1 inch (6.7 Kg/m³×25.4 mm) Microlite AA glass fiber blanket and two interleaf barrier layers 24 of Freudenberg C1999VM 200 grams/m² fabric coated with vermiculite, encapsulated within Insulfab 240 Mylar film, exhibited a burn through time of 10:24 minutes (film failure at 7:40 minutes; glowing mat exposed at 8:21 minutes; test stopped after 10:24 minutes).

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. An insulation system for increasing the burn through resistance of an aircraft fuselage having an outer skin, comprising:

an encapsulated multilayered insulation composite; the multilayered insulation composite including a first insulation layer, a second insulation layer, and a first interleaf barrier layer of a high temperature resistant reflective mineral material; the insulation layers each being glass fiber insulation layers having a thickness of about one inch and having a density between about 0.34 pcf and about 0.42 pcf; the insulation layers and the interleaf layer each having major surfaces extending in planes substantially parallel to each other and being enclosed within a polyimide film; and the multilayered insulation composite having a burn through time of at least five minutes.

2. The insulation system for increasing the burn through resistance of an aircraft fuselage having an outer skin, according to claim 1, wherein:

the interleaf barrier layer comprises a reflective mineral coated sheet.

3. The insulation system for increasing the burn through resistance of an aircraft fuselage having an outer skin, according to claim 1, wherein:

the insulation layers each have a thickness of about one inch.

4. The insulation system for increasing the burn through resistance of an aircraft fuselage having an outer skin, according to claim 1, wherein:

the first interleaf barrier layer is intermediate the major surfaces of the first and second insulation layers which are opposed to each other.

5. The insulation system for increasing the burn through resistance of an aircraft fuselage having an outer skin, according to claim 4, wherein:

the multilayered insulation composite includes a third insulation layer having a density between about 0.3 pcf and about 0.6 pcf and a second interleaf barrier layer of a high temperature resistant reflective mineral material; the third insulation layer and the second interleaf barrier layer each have major surfaces extending in planes substantially parallel to the major surfaces of the first and second insulation layers and the first interleaf barrier layer; and the second barrier interleaf barrier layer is intermediate the major surfaces of the second and third insulation layers which are opposed to each other.

6. The insulation system for increasing the burn through resistance of an aircraft fuselage having an outer skin, according to claim 1, wherein:

the first interleaf barrier layer of a high temperature resistant reflective mineral material is intermediate an outer major surface of the first insulation layer and the polyimide film.

7. The insulation system for increasing the burn through resistance of an aircraft fuselage having an outer skin, according to claim 6, wherein:

a second interleaf barrier layer of high temperature resistant reflective mineral material is intermediate the major surfaces of the first and the second insulation layers which are opposed to each other.

8. The insulation system for increasing the burn through resistance of an aircraft fuselage having an outer skin, according to claim 6, wherein:

there is a third insulation layer having a density between about 0.3 pcf and about 0.6 pcf and a second interleaf barrier layer of high temperature resistant reflective mineral material which is intermediate the opposed major surfaces of two of the insulation layers.

9. The insulation system for increasing the burn through resistance of an aircraft fuselage having an outer skin, according to claim 6, wherein:

the interleaf barrier layer comprises a reflective mineral coated sheet.

10. An insulation system for increasing the burn through resistance of an aircraft fuselage having an outer skin, comprising:

an encapsulated multilayered insulation composite; the multilayered insulation composite including a first insulation layer, a second insulation layer, and a first interleaf barrier layer of a high temperature resistant reflective mineral material; the insulation layers each being polyimide foam insulation layers which each have a thickness of about one inch and each have a density between about 0.3 pcf and about 0.6 pcf; the insulation layers and the interleaf layer each having a major surfaces extending in planes substantially parallel to each other and being enclosed within a polyimide film; and the multilayered insulation composite having a burn through time of at least five minutes.

11. An aircraft fuselage having an outer skin and an insulation system for increasing the burn through resistance of the aircraft fuselage, comprising:

an encapsulated multilayered insulation composite adjacent an inner major surface of the outer fuselage skin; the multilayered insulation composite including a first insulation layer, a second insulation layer, and a first interleaf barrier layer of a high temperature resistant reflective mineral material; the insulation layers each being glass fiber insulation layers having a thickness of about one inch and having a density between about 0.34 pcf and about 0.42 pcf; the insulation layers and the interleaf layer each having major surfaces extending in planes substantially parallel to each other and being enclosed within a polyimide film; and the multilayered insulation composite having a burn through time of at least five minutes.

12. The aircraft fuselage according to claim 11, wherein: the interleaf barrier layer comprises a reflective mineral coated sheet.

13. The aircraft fuselage according to claim 11, wherein: the insulation layers each have a thickness of about one inch.

14. The aircraft fuselage according to claim 11, wherein: the first interleaf barrier layer of a high temperature resistant reflective mineral material is intermediate an outer major surface of the first insulation layer and the polyimide film.

15. The aircraft fuselage according to claim 14, wherein: a second interleaf barrier layer of high temperature resistant reflective mineral material is intermediate the major surfaces of the first and the second insulation layers which are opposed to each other.

16. The aircraft fuselage according to claim 14, wherein: there is a third insulation layer having a density between about 0.3 pcf and about 0.6 pcf and a second interleaf barrier layer of high temperature resistant reflective mineral material which is intermediate the opposed major surfaces of two of the insulation layers.

17. The aircraft fuselage according to claim 11, wherein: the first interleaf layer is intermediate the major surfaces of the first and second insulation layers which are opposed to each other.

18. The aircraft fuselage according to claim 17, wherein: the multilayered insulation composite includes a third insulation layer having a density between about 0.3 pcf and about 0.6 pcf and a second interleaf barrier layer of a high temperature resistant reflective mineral material; the third insulation layer and the second interleaf barrier layer each have major surfaces extending in planes substantially parallel to the major surfaces of the first and second insulation layers and the first interleaf barrier layer; and the second barrier interleaf barrier layer is intermediate the major surfaces of the second and third insulation layers which are opposed to each other.

19. An aircraft fuselage having an outer skin and an insulation system for increasing the burn through resistance of the aircraft fuselage, comprising:

an encapsulated multilayered insulation composite adjacent an inner major surface of the outer fuselage skin; the multilayered insulation composite including a first insulation layer, a second insulation layer, and a first interleaf barrier layer of a high temperature resistant reflective mineral material; the insulation layers each being polyimide foam insulation layers which each have a thickness of about one inch and each have a density between about 0.3 pcf and about 0.6 pcf; the insulation layers and the interleaf layer each having major surfaces extending in planes substantially parallel to each other and being enclosed within a polyimide film; and the multilayered insulation composite having a burn through time of at least five minutes.

20. An insulation system for increasing the burn through resistance of an aircraft fuselage having an outer skin, comprising:

an encapsulated insulation composite system; the insulation composite system including an insulation layer having a density between about 0.3 pcf and about 0.6 pcf, and a barrier layer of a high temperature resistant reflective mineral material; the insulation layer and the barrier layer each having major surfaces extending in planes substantially parallel to each other and the composite system being enclosed within a polyimide film; the barrier layer being intermediate the insulation layer and the polyimide film; and the composite system having a burn through time of at least five minutes.

21. The insulation system for increasing the burn through resistance of an aircraft fuselage having an outer skin, according to claim 20, wherein:

the barrier layer comprises a reflective mineral coated sheet.

* * * * *